United States Patent [19]

Shayman

[11] 3,919,444

[45] Nov. 11, 1975

[54] ACOUSTICAL FIRE-RETARDANT WALL AND CEILING TILE

[76] Inventor: Harry I. Shayman, 777 N. Michigan Ave., Chicago, Ill. 60611

[22] Filed: Apr. 29, 1974

[21] Appl. No.: 465,244

[52] U.S. Cl. ............... 428/95; 180/.5; 180/DIG. 1; 264/219; 264/240; 264/241; 264/243; 264/257; 428/310; 428/315; 428/425; 428/920
[51] Int. Cl.² ................................ B32B 5/08
[58] Field of Search .......... 161/67, 62–66, 161/403, 159–161, 190; 181/.5, DIG. 1; 264/219, 240, 241, 243, 257

[56] References Cited
UNITED STATES PATENTS

| | | |
|---|---|---|
| 3,124,212 | 3/1964 | Stephens .................. 161/403 |
| 3,600,261 | 8/1971 | Kerres ..................... 161/67 |
| 3,695,987 | 10/1972 | Wisotzky .................. 161/67 |
| 3,764,448 | 10/1973 | Nisbet ..................... 161/403 |

*Primary Examiner*—Marion E. McCamish
*Attorney, Agent, or Firm*—Bruce K. Thomas

[57] ABSTRACT

Resinous structures such as wall and ceiling panels having a rigid urethane body or backing with a face or outer structure of tufted fiber glass material with or without an intermediate coating or layer of vinyl fire proofing material are disclosed. Both sides of the panels can have a face structure of tufted fiber glass material or a face structure of fiber glass fabric on one side and a tufted fiber glass layer on the other side. A method of producing such tiles is also disclosed. The panels exhibit Class A fire resistance properties and have good sound absorption properties.

12 Claims, 5 Drawing Figures

ACOUSTICAL FIRE-RETARDANT WALL AND CEILING TILE

BACKGROUND OF THE INVENTION

It is known that resinous materials offer a fire hazard when employed in construction such as in all types of ceiling and wall coverings since they continue to burn as long as heat and air are present. Although most of these materials can be treated to retard flame propagation or increase char formation and some like the thermo-setting materials are generally slow burning, caution must be exercised in the choice of treating materials since some systems are synergistic while others become antagonistic. Thus, some combinations of flame retarders actually increase flammability and retard char formation which cuts out the air supply and is one factor in fire retardation. Antimony oxide and high melting halogenated organics have been used in polypropylene with good results. However, if phosporus is added in the form of a stabilizer, filler or other additive, the flammability will be increased. The phosphorous and antimony react preventing the antimony from volatilizing and the phosporus from forming phosphoric acid, which is the char former.

THe decomposition reactions of the resin are affected by flame retarders producing different decomposition products, residues and different reactions in the flame. A good flame retarding system begins to work at the temperature the resin to be protected begins to decompose and should be active during the entire decomposition range. Thermosetting materials such as unsaturated polyesters, polyurethanes and epoxies are generally slow burning with the formation of large amounts of char. The decomposition products, however can be fatal if inhaled and as long as a flame is present to feed the fire these materials will continue to burn and cause extensive damage to room interiors.

The flame retarder requirements for urethanes are different from those of polyesters and epoxies. Both reactive monomeric and additive flame retarders are used with urethanes, but the former are preferred. The use of phosphorous or phosphorous/halogen combinations is generally recommended in the art. Thermoset hydroxylated aromatic hydrycarbon-aldehyde resins have been proposed, as in U.S. Pat. No. 3,518,156 to form composite, layered structures, such as tiles, which layers upon burning produce carbon dioxide and water. These resins are formed into a skin or sheet first and then applied to a panel structure. Additional heat resistance is imparted by a layer of metal foil, found to be unnecessary by the instant method.

Rigid polyurethane is somewhat difficult to treat since the flame retarders adversely affect the physical properties of the foam, or resinous body, but also do not properly adhere to form a stable structure to the foamed layers. Organic additives such as phosphate esters, polyphosponates, chlorinated paraffin, brominated compounds and inorganic additives, such as ammonium baromide, antimony oxide, barium metaborate, zinc borate and such reactive types as dibromoneopentyl glycol and chlorendic acid fall into this category.

In one aspect of this invention, a structure has been found which eliminates the necessity of using flame retarders within the urethane compositions and providing an exterior structure which safely prevents burning of the urethane. This structure can be augmented with exterior coatings of flame retarding materials, if desired. Thus, the material rigidity, lightness, sound attenuation and desirable construction properties of urethane are preserved while the flame retardency is brought to a level that is acceptable and within the standards set by building codes of the construction industry.

SUMMARY OF THE INVENTION

In accordance with this invention the provision of a fiber glass fabric layer on the exposed surfaces of a polyurethane structure, enhances the strength, increases the sound attenuation and reduces heat warpage, as well as providing a tremendous increase in fire resistance and flame retardation. By molding the urethane upon a fiber glass fabric layer, particularly by providing a close weave fabric layer with a tufted structure on one side of the urethane layer, the fire resistance is increased and distortion, crackling and deformation of the structure are minimal or absent. The mere provision of a layer of fiber glass fabric on one side of a urethane structure with or without a coating of fire retardant paint on the other side proved to be insufficient. Also the placement of fire retardant paint on both sides of the urethane structures failed the combustion or flammability tests. It was found after extensive testing that tufted fiber glass with or without a fire retardant paint at the interface with the urethane body produced the best results and passed the Class A fire test ASTM E 84 and also passes ASTM C 384-58 for sound attenuation.

DESCRIPTION OF THE DRAWINGS

The invention is illustrated in the drawings showing a ceiling panel in which.

Figure 1:
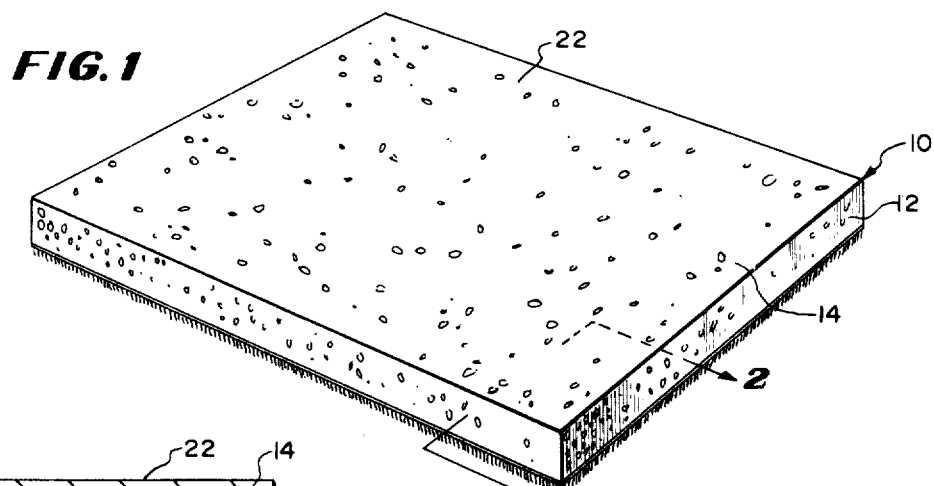
FIG. 1 is a perspective view of an illustrative ceiling panel.
Figure 2:
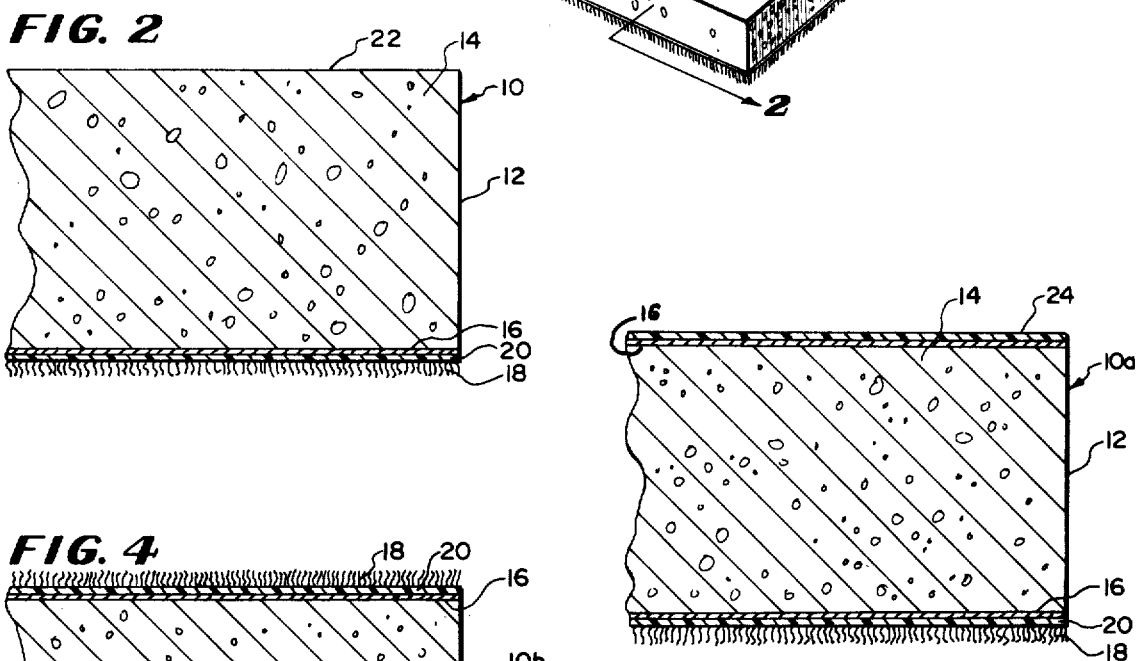
FIG. 2 is a fragmentary cross-sectional view taken along the lines 2—2 of FIG. 1.
Figure 3:
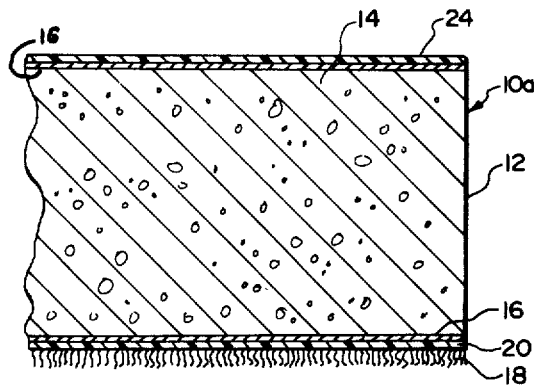
FIG. 3 is a fragmentary cross-sectional view of another structure for a panel.
Figure 4:
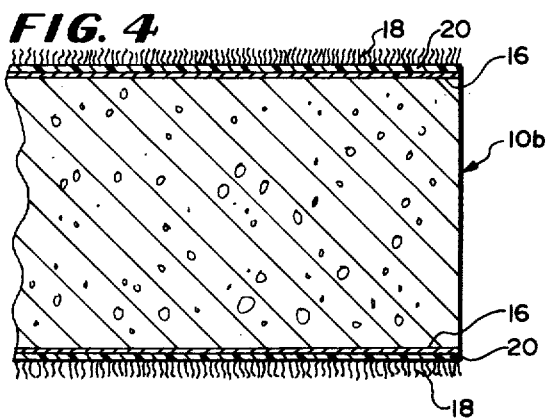
FIG. 4 is a fragmentary cross-sectional view of still another form of structure.

DESCRIPTION OF THE PREFERRED EMBODIMENT:

Referring to the FIGS. 1 and 2, a wall panel 10 is shown comprising a relatively thin rectangular layer of rigid polyurethane, indicated at 12, the cellular structure of which is indicated at 14, an inner layer 16 of fire retardant vinyl paint and an outer layer of tufted fiber glass cloth indicated at 18 having a fiber glass cloth base 20 on its inner side. The back or top surface 22 of the panel 10 is unprotected since, when used as a wall panel this surface will be against wallboard or plaster. The structure 10a shown in FIG. 3 is the same except that the urethane layer 12 has the fire retardant vinyl paint layer 16 and the tufted fiber glass cloth 18–20 on one side and an inner layer 16 of the fire retardant vinyl paint 16 and an outer layer of untufted fiber glass cloth 24 on the back side. The panel 10a is suitable for ceilings where the top side 24 will be against an air space. It has been found that the application of an untufted fiber glass cloth 24 on this side provides sufficient fire retardation in ceiling tiles. FIG. 4 shows a panel 10b which has the vinyl layer 16 and the tuft fiber glass cloth layer 18–20 on both sides.

The panels 10, 10a and 10b are illustrative of urethane structures prepared in accordance with this invention. Other forms of panels than the rectangular shape shown may be prepared in accordance with the invention. The illustrative panels can be of different sizes such as 4 feet×8 feet, 2 feet×2 feet and 1 foot×2 feet. The urethane layer 12 for the structure is a rigid urethane foam system, normally used in the plastics industry for insulation and for buoyancy. The proprietary product of STEPAN Chemical Co. known as STEPAN-FOAM Bx-289, is a preferred rigid urethane foam system. A fluorocarbon blowing agent is used and the flame retarder comprises a phosphated halogen.

The polyurethane layer 12 is the reaction product of a polyisocyanate and a polyhydroxyl compound e.g., the reaction of an 80/20 mixture of 2.4 and 2.6 isomers of tolylene diisocyanate and polyether such as propylene oxide adducts of such matterials as sorbitol, sucrose, pentaerythritol, methyl glucoside and diamines. Most rigid foam polyethers range in functionality from triols to octols, in equivalent weights from 75 to 160. These rigid foam formulations include catalysts, cell stabilizers and blowing agents. A preferred rigid urethane foam system exhibits the following properties for a 12 inch × 12 inch panel poured at 70°F.

TABLE I

| Physical Property | Value |
|---|---|
| Core density | 2.0 – 2.40 |
| Compression strength (at 10% strain) | |
| parallel | 50 – 52 psi |
| perpendicular | 30 – 53 psi |
| Tensil strength (at ultimate strain) | |
| parallel | 60 – 65 psi |
| perpendicular | 40 – 45 psi |
| Shear strength (at ultimate strain) | |
| parallel | 24 – 30 psi |
| perpendicular | 25 – 28 psi |
| Water absorption | 0.05 – 0.09 lbs/ft$^2$ |
| Thermal conductivity | |
| BTU/hr/ft$^2$/°F/in | 0.12 – 0.14 |
| Flammability Class ASTMD-1692-677 | Self extinguishing |
| Dimensional stability - panel core | good |

The coating 16 shown in the drawings is a vinyl composition comprising high molecular weight vinyl copolymers and vinyl homopolymer resins containing a hardener or stabilizer to minimize heat and light effects and an oily plasticizer to effect hardness, flexibility and low temperature properties, as is known in the art and will be described in more detail. This coating prevents any bleed through of the polyurethane into the fiber glass layer 18 and has been found to greatly enhance the fire resistance properties of the structures of this invention.

The tufted fiber glass layer 18 comprises ordinary fiber glass mat such as used in upholstery or carpets. The fiber glass layer 24 comprises untufted fiber glass cloth. These materials are closely woven cloth and can be polypropylene cloth, while the tufts 18 can be nylon, wool or any such suitable carpeting material.

Figure 5:
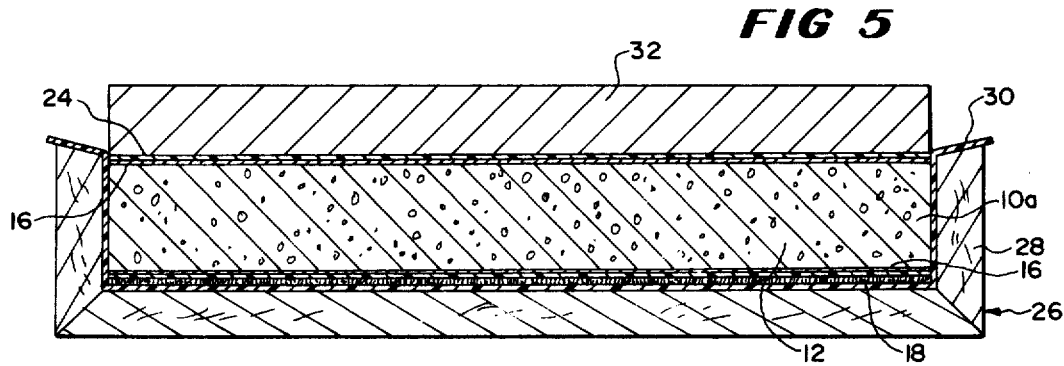
FIG. 5 is a cross-sectional view of a mold to illustrate the steps of the method of forming panel structures in accordance with this invention.

Referring to FIG. 5 there is illustrated the mold form 26 comprising an open-topped wooden vessel 28 and an inner polyethylene liner 30 which prevents the urethane from adherring to the sides and allows easy removal of the molded panel. The liner 30 can also be formed of polypropylene. A mold release compound may also be used.

The layer of tufted fiber-glass cloth or woolen carpet 18 is cut to size so that it fits along all four corners of the mold 28. The vinyl coating 16 is next applied to the back or untufted side of the cloth base 20 thereof and the coated fiber glass piece 18 is laid within the mold, tufted side down. The vinyl coating 16 is applied by any means such as spraying or brushing evenly over the cloth surface 20. Either before or after the vinyl coating 16 has set and preferably while it is still tacky, the body 12 of mixed urethane and a suitable catalyst is poured into the mold and spread over the vinyl coating 16. After the urethane has been poured into the mold and before the rise or set thereof has taken place, the last inner layer of cloth 24 is applied with the vinyl coating 16 already sprayed or brushed thereon. The vinyl coatings 16 contact the urethane layer directly at both interfaces to form a strong bond with the urethane as it rises and sets. The press or cover member 32 is then placed over the sandwiched layer to control the rise of the urethane foam to a prescribed thickness. This forms the product of FIG. 3. If desired, a final backing layer of tufted fiber glass fabric can be added to form the product of FIG. 4 or these latter layers can be omitted to form the product of FIG. 1.

An important aspect of the invention is the fire resistance properties of the finished structure. This is demonstrated by the following examples.

EXAMPLE I

A test panel measuring 12 inches × 12 inches × 1 inch was affixed to a stand with its planar surface perpendicular as in a wall installation. This panel consisted of a ⅞ inch body layer of polyurethane rigid foam and a ⅛ inch outer layer of fiber glass fabric (untufted). No vinyl coating was used. A flame from a can of Sterno was placed normal to the fabric surface 18 with the blue cone top of the flame just reaching the fabric. After 33 minutes the Sterno was consumed and the flame died out. The panel structure blistered, cracked and charred through to the back side. The structure failed since air was allowed to penetrate. As long as the flame was present the panel continued to deform. The panel also warped, a condition which lets air into the back side of adjoining panels and is undesirable.

EXAMPLE II

A test panel having the structure of FIG. 3 was tested under the conditions of EXAMPLE I with the flame against the tufted fiber glass layer 18. There was no warping, cracking or burning and the panel passed the Class A test.

EXAMPLE III

A test panel like that used in EXAMPLE II was tested with the flame against the fiber glass cloth side 24 with similar results.

EXAMPLE IV

A test panel like FIG. 4 was flame tested on both sides sequentially with similar results. No distortion resulted although there was a blackening in the areas of flame impingement.

The panel of EXAMPLE I failed the Class A (28) Test (ASTME 84) while the panels of EXAMPLES II, III, IV and V passed this test. It is thus seen that a layer of fiber glass cloth with or without tufting with an inner layer or vinyl provided the necessary fire retarding characteristics. The vinyl coating 16 in the Examples was Geon 101F-4 to be described.

As aspect of this invention is the provision of wall or ceiling panels for construction exhibiting combined fire retardant properties and good sound attenuation properties. To illustrate a test panel having the wall structure of FIG. 3 was subjected to the test conditions of ASTM:C 384-48 entitled "Absorption of Accoustical Materials by the Tube Method" with the following results.

TABLE II

| Frequency, cps | Sound absorption coefficient |
|---|---|
| 125 | .82 |
| 250 | .85 |
| 500 | .77 |
| 1000 | .74 |
| 2000 | .82 |
| 4000 | .77 |

The layers or films of vinyl 16 in the foregoing examples may comprise vinyl dispersion resins of the polyvinyl chloride homopolymer and vinyl chloride-vinylacetate copolymer types.

The proprietary products of B. F. GOODRICH & CO. known under the trademark "Geon" vinyls were used in the examples and tests. The properties of these compositions are shown in Table III.

TABLE III

| | Vinyl Blending Resins | | | |
|---|---|---|---|---|
| Property: | Geon 101F-4 | Geon 130 × 10 | Geon 121 | Geon 130 × 24 |
| Inherent viscosity ASTM D-1243-66 | 1.11 | 1.10 | 1.20 | 1.10 |
| Specific gravity (approx) | 1.40 | 1.39 | 1.40 | 1.39 |
| Flow Properties: | | | | |
| Brookfield RVF Visc. (cps) | 4,500 to 5,300 | 28,000 to 140,000 | 7,000 to 13,000 | 8,000 to 32,000 |
| Film Properties: | | | | |
| Tensile strength (psi) at 350°F | 1,400 | 2,500 | 2,800 | 3,000 |
| at 375°F | 1,800 | 2,400 | 2,900 | 2,900 |
| at 400°F | 2,150 | 2,200 | 2,800 | 2,750 |
| Ultimate elongation % at 350°F | 160 | 400 | 425 | 390 |
| at 375°F | 220 | 350 | 425 | 380 |
| at 450°F | 300 | 325 | 400 | 350 |
| Composition (parts): | | | | |
| Geon dispersion resin | 40 | 100 | 100 | 100 |
| Geon 121 | 60 | — | — | — |
| Plasticizer | 60 | 60 | 60 | 60 |
| Stabilizer | 2 | 2 | 2 | 2 |

The proprietary product "Geon 101F-4" is a high molecular weight, fine particle size, polyvinylchloride resin of the momopolymer type exhibiting a fineness of grind of 110–140 microns, exhibiting good viscosity reduction and stability, and is termed a vinyl blending resin.

The proprietary product "Geon 130 × 10" is a vinylchloride-vinylacetate copolymer resin, exhibiting high viscosity under low and high shear. "Geon 121" is a general purpose high molecular weight resin of the homopolymer polyvinyl chloride type, not tested, but forming a part of the product known as "Geon 101F-4". The product known as "Geon 130 × 24" is another vinylchloride-vinyl acetate copolymer resin, used and tested, which is high mol. wt. and In those instances where Class A fire resistance properties are not required, it is apparent that the tufted fiber glass cloth layer 24 can be replaced by ordinary carpet material or equivalent coverings that do not exhibit fire retardation properties. For this purpose, the layer 24 can be any of a wide variety of coverings made of natural or synthetic fibers and displaying different textures and designs. The remaining structures of the panels so formed are unchanged in order to take advantage of the cooperating interfacial bonds. A tufted outer surface for these structures is preferred for sound attenuation properties.

What is claimed is:

1. A laminated rigid construction panel comprising:
   a rigid foamed plastic body structure;
   an outer layer of tufted carpet material; and
   an intermediate resinous vinyl layer of binding material bonded between said rigid foamed, plastic body and said layer of tufted carpet material;
   said body structure comprising the sole unifying and rigidifying means for said layers to form said rigid construction panel.

2. A laminated construction panel in accordance with claim 1 in which:
   said foamed plastic body structure comprises rigid polyurethane.

3. A laminated construction panel in accordance with claim 2 in which:
   said rigid polyurethane body structure exhibits the following properties:

| compression strength (at 10% strain) | | |
|---|---|---|
| parallel | 50–52 | psi |
| perpendicular | 30–43 | psi |
| tensil strength (at ultimate strain) | | |
| parallel | 60–65 | psi |
| perpendicular | 40–45 | psi |
| shear strength (at ultimate strain) | | |
| parallel | 24–30 | psi |
| perpendicular | 25–28 | psi |
| thermal conductivity BTU/hr/ft²/°f/in | 0.12–0.14 | | and said vinyl layer is a material of the group consisting of a polyvinyl chloride resin, a vinyl chloride-vinylacetate resin copolymer resin and mixtures thereof having specific gravities of about 1.40 and exhibiting inherent viscosities of about 1.10 to 1.20, tensile strengths of at least about 1,400 psi at 350°F and an ultimate elongation at 350°F of 160% and greater.

4. A laminated construction panel in accordance with claim 1 in which:
   said outer layer of tufted carpet material includes a fabric backing layer bonded to said intermedial resinous layer.

5. A laminated construction panel in accordance with claim 4 in which:
   said intermediate resinous layer permeates said fabric backing layer to form a barrier against bleeding of said foamed plastic body structure formed insitu

6. A laminated construction panel in accordance with claim 1 in which:

said rigid foamed plastic body comprises rigid polyurethane;

said outer layer of tufted carpet material comprises a fiberglass carpet; and said intermediate resinous layer is a material of the group consisting of a polyvinyl chloride resin, a vinyl chloride-vinylacetete resin copolymer resin and mixtures thereof having specific gravitied of about 1.40 and exhibiting inherent viscositied of about 1.10 to 1.20, tensile strengths of at least about 1,400 psi at 350°F and an ultimate elongation at 350°F of 160% and greater.

7. A laminated rigid fire retarding and sound attenuating construction panel comprising:

a body structure of rigid polyurethane foam defining a substantially planar surface on one side;

a fire retarding vinyl layer is a material of the group consisting of a polyvinyl chloride resin, a vinyl chloride-vinylacetate resin copolymer resin and mixtures thereof having specific gravities of about 1.40 and exhibiting inherent viscosities of about 1.10 to 1.20, tensile strengths of at least about 1,400 psi at 350°F and an ultimate elongation at 350°F of 160% and greater on said planar surface; and an outer layer of tufted fiber glass material over said vinyl layer and bonded thereto;

said body structure comprising the sole unifying and rigidifying means for said layers to form said rigid construction panel.

8. A construction panel in accordance with claim 7 in which:

the other side of said body structure includes a layer of fire retarding vinyl resin.

9. A construction panel in accordance with claim 8 in which:

said other side includes a layer of fiber glass cloth material bonded to said layer of fire retarding vinyl resin.

10. A construction panel in accordance with claim 9 in which said fiber glass material includes an outer tufted layer and an inner fiber glass cloth layer.

11. The method of forming a rigid construction panel which comprises:

laying a sized piece of fiber glass cloth material on the bottom of a mold having retaining side walls and an open top;

applying a layer of vinyl resin to exposed side of said vinyl resin layer in sufficient quantities to form a body structure thereover;

maintaining said mold at a polymerizing temperature for said urethane; and removing said panel from said mold at the completion of the polymerization reaction;

said body structure comprising the sole unifying and rigidifying means for said layers to form said rigid construction panel.

12. The method in accordance with claim 11 in which: said mold includes a polyalkylene mold release liner.

* * * * *